United States Patent [19]

MacGregor et al.

[11] Patent Number: 4,510,365

[45] Date of Patent: Apr. 9, 1985

[54] ELECTRONIC DEPTH CONTROLLER FOR EDM APPARATUS

[75] Inventors: John R. MacGregor; Gary F. Rupert, both of Ann Arbor; Thomas M. Kennedy, Chelsea, all of Mich.

[73] Assignee: Raycon Corporation, Ann Arbor, Mich.

[21] Appl. No.: 375,501

[22] Filed: May 6, 1982

[51] Int. Cl.³ .............................. B23P 1/08; B23P 1/14
[52] U.S. Cl. .............................. 219/69 G; 204/129.25; 204/129.5; 219/69 C; 219/69 S
[58] Field of Search .............. 219/69 C, 69 G, 69 M, 219/69 R; 204/129.5, 129.25

[56] References Cited

U.S. PATENT DOCUMENTS

| | | | |
|---|---|---|---|
| 3,435,176 | 3/1969 | Lobur | 219/69 G |
| 3,694,599 | 9/1972 | Davis | 219/69 G |
| 3,843,864 | 10/1974 | Wohlabaugh | 219/69 G |
| 4,039,779 | 8/1977 | Rupert | 219/69 G |
| 4,049,942 | 9/1977 | Balleys et al. | 219/69 G |
| 4,185,184 | 1/1980 | Pfau | 219/69 C |
| 4,188,522 | 2/1980 | Baker | 219/69 M |
| 4,263,494 | 4/1981 | Martin | 219/69 G |
| 4,345,131 | 8/1982 | Semon et al. | 219/69 G |
| 4,361,745 | 11/1982 | Rupert et al. | 219/69 C |

FOREIGN PATENT DOCUMENTS 41-12326 7/1966 Japan .............................. 204/129.25

OTHER PUBLICATIONS

"Micro Computer Controlled Spark Erosion" by Heuvelman et al., Sep. 1980, pp. 24–28.

Primary Examiner—Roy N. Envall, Jr.
Assistant Examiner—Geoffrey S. Evans
Attorney, Agent, or Firm—Stephenson & Boller

[57] ABSTRACT

EDM apparatus has a servo drive under the control of a main control system for advancing a machining electrode toward a conductive workpiece. When the electrode arrives at a surface of the workpiece to commence EDM machining, the main control system causes a sudden deceleration of the servo. The depth controller detects this sudden deceleration by means of a sensor and sets a zero reference plane from which machining depth is measured. The depth controller can also detect electrode breakthrough by detecting servo acceleration occurring when the electrode breaks through a surface of the workpiece.

6 Claims, 8 Drawing Figures

ELECTRONIC DEPTH CONTROLLER FOR EDM APPARATUS

BACKGROUND AND SUMMARY OF THE INVENTION

This invention relates generally to EDM (electrical discharge machining) apparatus and is specifically concerned with a new and improved electronic depth control for such apparatus. In certain respects the present invention may be considered as an improvement upon the earlier commonly assigned patent application entitled "Electronic Depth Controller For EDM Apparatus", Ser. No. 346,689, filed Feb. 8, 1982, now abandoned.

EDM has been successfully applied to machining of precision holes in objects. The advantages of EDM are wellknown in this respect and will not be repeated here. Suffice it to say the EDM can achieve precision results where other procedures and apparatus would be totally incapable of even approximating the performance of EDM. In spite of the manifold advantages of EDM, there are particular products where extreme precision in machining holes is required. An example of one such situation is the machining of multiple blind holes in a workpiece where the hole depths are critical. Another example is where multiple through-holes are being machined, and it is important that all electrodes break through at substantially the same time.

Advances in EDM control apparatus are demonstrated by assignee's control system identified by the designation CP-60. The CP-60 control system is a microprocessor-based control which greatly enhances the performance of EDM apparatus. That system represents an advance toward the ultimate objective of a completely adaptive control system. In an adaptive control system actual machining conditions, or indicators of actual machining conditions, are monitored while in progress, and the manner of control is concurrently adapted in respect of the monitored conditions or indicia thereof so that optimum machining action occurs. By way of example an adaptive control may on the one hand provide a more rapid machining procedure where the actual machining is easier than anticipated, and it may on the other hand provide a slower machining rate where the actual machining operation is more difficult than originally anticipated.

The above mentioned commonly assigned patent application, Ser. No. 346,689 relates to an electronic depth controller which is employed in operative association with the main EDM control system. The electronic depth controller acts upon selectable input data relating to advance of the machining electrode or electrodes, and hence depth of hole or holes, machined in a workpiece. It interacts with the main EDM control system in a manner whereby difficult hole machining problems such as those referred to above in connection with blind holes and simultaneous break through of multiple holes are solved. This can have important benefits in the EDM machining of workpieces. By virtue of the electronic character of the depth controller, in conjunction with the electronic character of the main control system, virtually instantaneous response to actual machining conditions occurs whereby depth control and simultaneous breakthrough are accomplished with precision. In this regard the preferred embodiment of depth controller comprises its own microprocessor which receives selectable input data from input selector switches which are mounted on a control panel. The microprocessor acts upon data supplied by the selectable input switches and provides output data based upon the selectable input data which is conveyed to the microprocessor of the main control. The electronic depth controller thereby provides information relating to machining depths and the main control acts upon this information in controlling the machining process. The microprocessor of the depth controller is programmed with its own set of operating instructions. The input selector switches on the control panel include one set of switches for setting an initial depth limit, another set of switches for setting a machining increment, and another for setting the number of machining increments. It also possesses the capability for operating in either a mode 1 or a mode 2 format.

The present invention is directed to a new and improved electronic depth controller for EDM apparatus in which the overall operating efficiency is improved and which automatically esatblishes the correct zero reference point for the initiation of EDM machining and thereafter terminates EDM machining operation once the desired depth limit has been reached. An advantage of this aspect of the invention is that it becomes unnecessary to gage a workpiece to a reference plane for purposes of determining the zero depth reference. Instead with the present invention the zero reference plane is established automatically by the depth controller itself. This reduces the time spent by a machine operator in setting up a job on a machine. Also by minimizing operator involvement it reduces the likelihood for operator-induced errors.

The invention has the further advantage in that maximum efficiency in the operating cycle can be obtained because the electrode is fed toward the workpiece at the maximum rate of advance until such time as actual machining occurs. Upon occurrence of actual machining the servo drive is automatically slowed down from the rapid advance rate to a slower machining feed rate. The depth controller of the present invention detects the sudden change in velocity of the servo due to the detection of initial machining current and it uses this sudden change in velocity of the servo to set the zero reference plane from which the machining depth is measured. Thus the zero reference plane is always properly defined as the surface of the workpiece in which the machining takes place. The absolute location of the zero reference plane is immaterial.

The foregoing features, advantages, and benefits of the invention along with additional ones, will be seen in the ensuing description and claims. The drawings disclose a preferred embodiment of the invention in accordance with the best mode contemplated at the present time in carrying out the invention.

DESCRIPTION OF THE PREFERRED EMBODIMENT

Before proceeding with the detailed description it should be understood that the disclosure is of one specific example of the present invention. Accordingly the description should not be construed as imposing a limitation on the scope of the invention.

Figure 1:
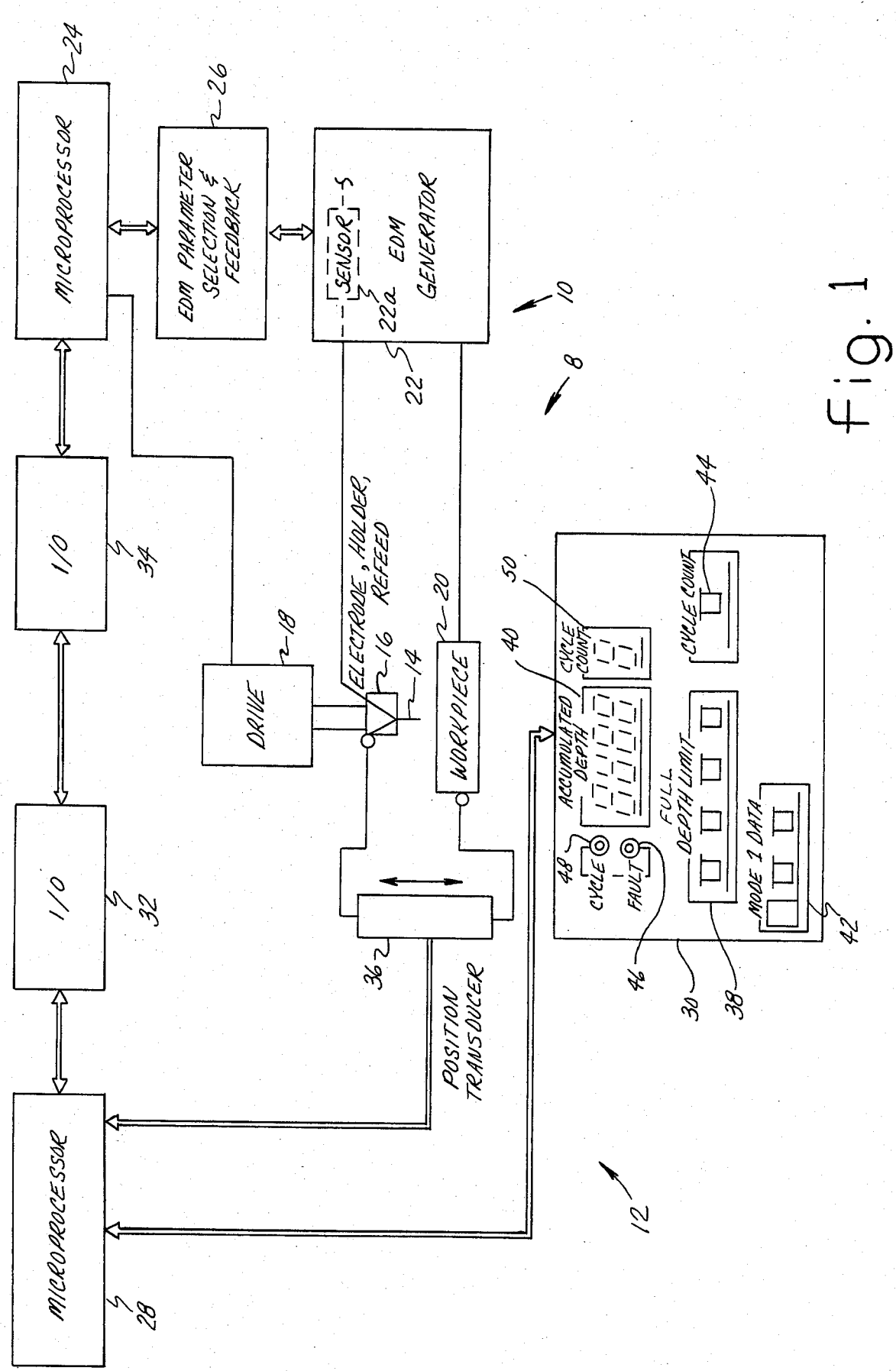
FIG. 1 is a schematic diagram of EDM apparatus including the improved electronic depth controller of the present invention.

Turning therefore to the detailed description one will see that FIG. 1 discloses in schematic form an EDM apparatus 8 including a main control system 10 with which the electronic depth controller 12 of the present invention is operatively associated.

The EDM apparatus 8 comprises a single individual electrode 14 mounted on a holder 16. A servo drive 18 is operatively associated with the holder 16 to advance and retract the holder 16, and hence the electrode 14, toward and away from a workpiece 20 which is to be machined by the apparatus. The holder may also include, if desired, a conventional refeeding mechanism for refeeding the electrode on the holder so as to maintain the electrode tip in a predetermined relationship to compensate for any tip erosion.

The apparatus further includes an EDM generator 22 which is operatively associated with the electrode 14 and the workpiece 20 to provide machining current. Control of the apparatus is provided by the main control 10; however the depth controller 12 interacts with the main control 10 in a manner which will become more apparent as the description proceeds. In the disclosed embodiment the main control 10 is an electronic system of the microprocessor type comprising a microprocessor 24 as well as additional electronic circuit devices and components which are designated generally by the block 26 entitled "EDM Parameter Selection & Feedback." The main control system is so integrated with the drive 18 and the EDM generator 22 that the holder 16 is positioned by the drive in accordance with command signals from the control to correspondingly position the electrode 14 in relation to the workpiece 20. Hence the drive is operable to advance the electrode 14 toward the workpiece and to maintain the electrode in desired machining gap relation to the workpiece 20 while the EDM generator 22 supplies machining current across the gap between the electrode 14 and the workpiece 20 so that the desired machining operations on the workpiece are conducted. The electrode may be shaped in accordance with that of the desired hole which is to be machined in the workpiece. The actual machining operations are conducted in the vicinity of the tip of the electrode, and hence a working gap exists between the electrode tip and the workpiece across which electrical discharge machining current flows.

The circuit components designated by the general reference numeral 26 establish selected machining parameters for the operation of the EDM apparatus such as advance and retract speeds, machining current, and other standard parameters involved in EDM operations. This much of the apparatus which has been described, with the exception of the electronic depth controller 12, constitutes a previously known system, such as the CP-60 system developed by assignee and referred to above.

The electronic depth controller 12 of the present invention is operatively associated with this previously known equipment and is shown in FIG. 1 to comprise its own microprocessor 28 and a control panel 30. The control panel 30 in general provides to the microprocessor 28 selectable input data related to the depth of hole to be machined by the electrode 14 in workpiece 20. Also there is provided an input-output (I/O) port 32 associated with microprocessor 28 and an input-output port 34 associated with microprocessor 24 of the main EDM control system 10. This latter input-output 34 may be an existing part of the system of the main microprocessor control or it may be an additional device which is added. The two input-output ports 32, 34 are in turn operatively associated whereby a bi-directional interface is provided between the two microprocessors 28, 24 for data signal transmissions.

Also associated with the electronic depth controller is a position transducer 36. The preferred form of position transducer 36 is a linear variable differential transformer (LVDT). The LVDT is operatively associated between the workpiece 20 and the holder 16 so that the effective output inductance of the LVDT is a function of the position of the holder 16, and hence the tip of electrode 14, in relation to workpiece 20. While the diagram schematically shows the transducer input coupled between the workpiece 20 and the holder 16, it will be appreciated that the position transducer might be mounted on the table on which the workpiece is mounted and connected with some other point in the drive other than the holder 16. The primary consideration however is that the transducer provide an accurate measurement of the position of the electrode tip in relation to the workpiece 20. The output of the transducer 36 is supplied as an input to the microprocessor 28 whereby a signal indicative of the position of the tip of electrode 14 is supplied to the microprocessor 28. While the LVDT output is obviously of analog character, it may be readily converted to digital form by conventional analog-to-digital conversion procedure. The exact manner in which this position information is used by the microprocessor 28 will become more apparent from the ensuing description.

Attention is now directed to further detail of the control panel 30. The control panel comprises a set of selectable data switches, referred to by the general reference numeral 38, which is used to set the Full Depth Limit. In the disclosed embodiment these switches may take the form of selectable thumbwheel switches, each of which may be selectably set to one of the digits 0 through 9. Each switch corresponds to a digit of particular significance. It will be appreciated, however, that other specific selectable input devices may be used if desired. The Full Depth Limit setting is used to set the depth of hole which is to be machined in workpiece 20 by electrode 14 as measured from the exterior surface of the workpiece in which the hole is to be machined. An accumulated depth read out display 40 is also provided on the face of the control panel. This display acts upon the information from LVDT 36 as processed by the microprocessor 28, to provide an instantaneous readout of the actual position of the holder 16, and hence of the tip of electrode 14. During machining operation it will represent the actual instantaneous depth of the hole being machined.

It may be deemed desirable, when creating certain holes, to machine in a succession of machining increments each of which is less than the full depth of hole which is to be machined. For this purpose a further set of selectable input switches 42 is provided on the face of the control panel and it is referred to as Mode 1 Data. These switches may also take the form of selectable thumbwheel switches each of which may be selectively set to one of the digits 0 through 9. The mode 1 data input as set on the switches 42 defines the depth of one machining increment. The number of machining increments which are to be executed is established by means of a cycle count switch 44 also on the face of the control panel. The cycle count switch may also take the form of a selectable thumbwheel switch which may be selectably set to one of the decimal digits 0 through 9. The number set on the cycle count is what establishes the number of mode 1 data machining increments which is to be executed.

Depending upon the particular values of the inputs which are set on the respective sets of switches 38, 42, 44, the mode 1 data increment on switches 42 multiplied by the number of increments set on switch 44 may be either less than, equal to, or greater than the Full Depth Limit set on switches 38. It is therefore appropriate to employ a fault indicator lamp 46 which may illuminate under certain conditions. For example under one condition it may be appropriate to give a fault where the full number of machining increment cycles has been executed without reaching the Full Depth Limit set on switches 38.

A cycle indicator lamp 48 is also provided, and it illuminates during machining operations indicating that the machining cycle is in progress. A cycle count readout display 50 is also shown on the face of the control panel and it indicates the number of the particular machining increment which is presently being executed.

Figure 2:
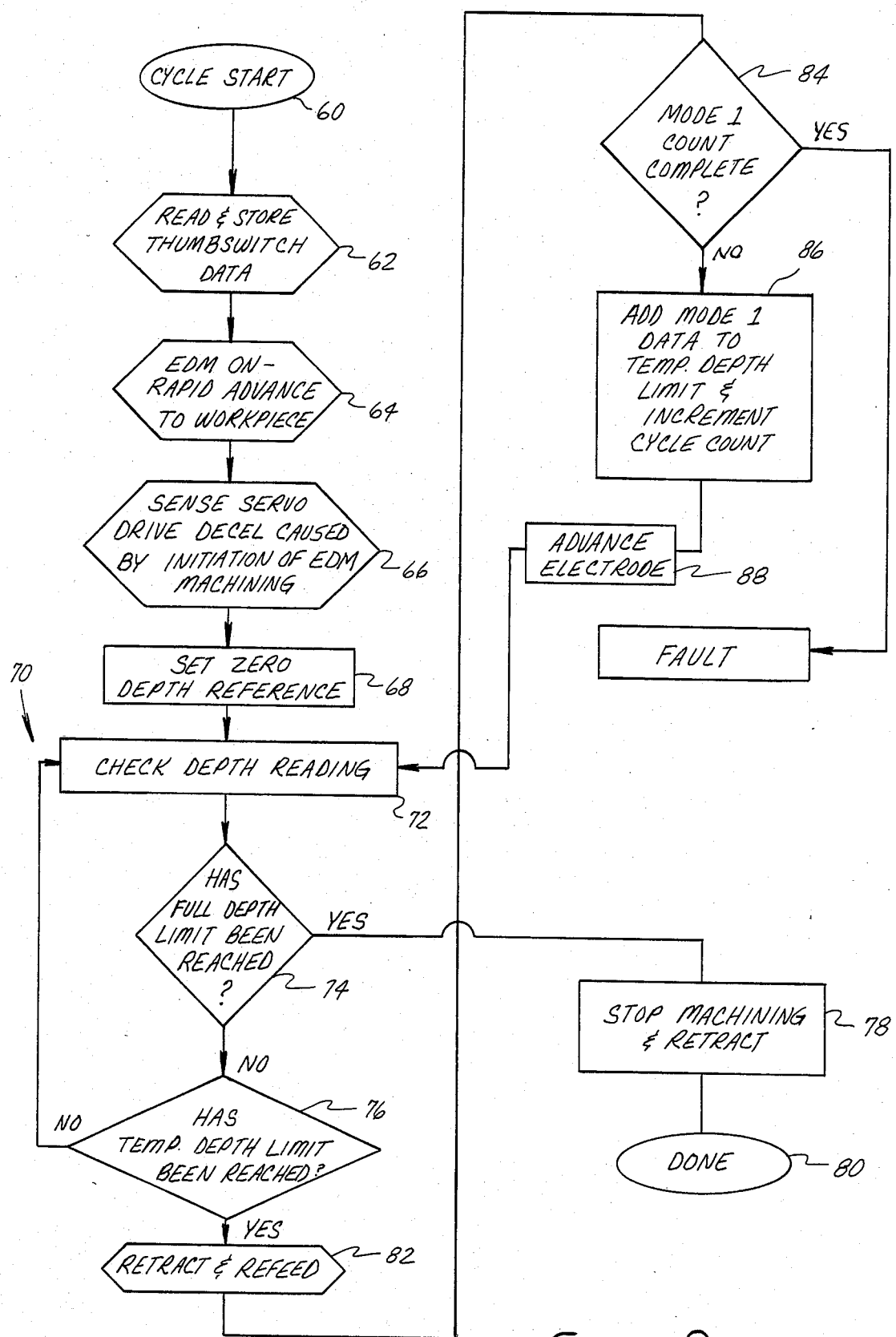
FIG. 2 is a schematic flow diagram of one mode of operation of the improved electronic depth controller of the present invention.

FIG. 1 having therefore been described, is now appropriate to consider further details of the operation of the electronic depth controller 12 and for this purpose reference is made to FIG. 2. FIG. 2 illustrates a schematic flow diagram of logic involved in the operation of the electronic depth controller. As mentioned earlier one important advantage of the depth controller of the present invention is that the set up procedure for a workpiece is less complicated and less time-consuming. The workpiece is located in the correct horizontal position where the hole is to be drilled. The vertical elevation of the surface into which the hole is to be machined is not critical. Therefore in addition to the task of horizontally locating the workpiece in the correct position the only other task which the operator need perform is to set the Full Depth Limit, and, if appropriate, a mode 1 data increment along with the number of mode 1 data increments which are to be executed. Typically the use of mode 1 data machining increments will occur only where it is desired to frequently refeed the electrode on the holder. Thus at the conclusion of each mode 1 data machining increment the electrode is withdrawn and refed on the holder.

The flow diagram shown in FIG. 2 constitutes the logic sequence by which the microprocessor 28 is programmed based upon the selectable data set on the control panel 30 as well as on its interaction with the main control 10. The detailed program can be developed from the flow diagram by a competent individual having knowledge of conventional microprocessor programming techniques, and hence it is deemed unnecessary to include details of an example of a program in this present application. Furthermore the invention, in its generic aspect, does not involve particular details of a program, and it will therefore be recognized that the invention contemplates the use of any of a number of possible programs.

With the workpiece properly fixtured, the cycle is started as indicated by the reference numeral 60. Upon starting of the cycle the microprocessor 28 executes the step 62 in which it reads the data on the Full Depth Limit switches 38, the mode 1 data switches 42 and the cycle count switch 44. The data is stored in appropriate data stores of the microprocessor.

At the same time in response to starting of the cycle, the main EDM control turns on the EDM generator 22 and causes drive 18 to rapidly advance the holder 16 and electrode 14 toward the workpiece at maximum servo velocity (step 64). This will ensure that the electrode tip is brought into a machining condition in the minimum time. During advance of the electrode toward the workpiece there exists a voltage between the electrode tip and the workpiece; however there is no machining current. As the electrode tip approaches the workpiece machining is deemed to commence at the initiation of flow of a machining current between electrode and workpiece, coupled with a reduction in voltage between the electrode tip and the workpiece. An appropriate sensing device 22a, for example within the EDM generator 22, monitors the occurrence of machining. The closed loop nature of the control is such that in response to the detection of the initiation of machining the rapid advance of the servo drive is immediately arrested to a much slower machining feedrate. The electronic character of the main control 10 enables this to be accomplished without the electrode tip plunging into the workpiece in an undesired manner.

The present invention arises through the recognition that the sudden deceleration in the servo drive which occurs in response to the detection of the initiation of machining current can be used to establish the zero reference plane for the electronic depth controller. Accordingly, the rapid deceleration of drive 18 is detected by position transducer 36. Because the output of LVDT 36 is repeatedly being read by the microprocessor 28 at very close time intervals the corresponding sudden change in the rate of change of the LVDT signal is immediately detected by microprocessor 28 (step 66), and it is used to set a zero depth reference within an appropriate store of the microprocessor (step 68). Thus the setting of the zero reference within the microprocessor always corresponds exactly to the surface of the workpiece in which the hole is to be machined by the electrode 14. The reading of the analog position transducer 36 is accomplished, as noted earlier, in conventional fashion by means of appropriate circuitry associated with the microprocessor. The zero setting may also be used to zero the readout 40 so that the readout provides a true position of the electrode relative to the surface of the workpiece.

Once the zero depth reference has been set, the microprocessor 28 executes a repeated checking of the depth reading by repeatedly executing a loop indicated by the step 70. Loop 70 comprises in addition to the step of checking the depth reading 72, the steps of determining if the Full Depth Limit has been reached (step 74) and the step of determining whether a temporary depth limit has been reached (step 76). The determination as to whether the Full Depth Limit has been reached is based upon the microprocessor comparing the actual instantaneous depth reading, as measured from zero depth reference set in the microprocessor 28 as explained above, against the Full Depth Limit setting on switches 38 which was read by microprocessor at the beginning of the cycle. This determination posed by step 74 will be answered in the negative until the Full Depth Limit has been actually reached. However, once the Full Depth Limit has been reached, the machining operation is completed and this results in a retraction of the holder and electrode (step 78 followed by a done signal 80). In this regard the depth controller signals the main control to cease machining and to retract the electrode.

During the progress of the machining operation toward the objective of completing a hole, a further comparison of the actual depth limit with a temporary depth limit is made as indicated by the step 76. The temporary depth limit is set in accordance with the mode 1 data increment set on switches 42. When the cycle start step 60 occurs, the value of the mode 1 data is read and loaded into a temporary depth limit store of the microprocessor to thereby establish a temporary depth limit. At the same time a count store for counting the number of mode 1 data cycles executed is also loaded with value such as the numeral one indicating that this is the first loading of mode 1 data increment into the temporary depth limit store. When the electrode has machined to the first mode 1 data increment, the step 76 determines that the temporary depth limit has been reached. At this time microprocessor 28 signals microprocessor 24 so that the servo retracts the electrode for refeeding on the holder (step 82). The count in the count store is compared against the previously read number of cycle counts entered on switch 44 (step 84) and if the desired number has not as yet been reached then a further mode 1 data increment is added to the temporary depth limit (step 86) thereby updating the latter to a new value. The machining operation is now continued by the electrode being advanced into the hole in progress (step 88). The temporary depth limit having been updated, the loop 70 is repeatedly executed as the machining continues. This process repeats until either the Full Depth Limit is reached or the preset number of cycles of mode 1 data increments have been executed. If this latter event occurs it is possibly an indication that the Full Depth Limit has not in fact been reached, and accordingly it is deemed appropriate to give a fault indication by illuminating the fault light 46. On the other hand, once the Full Depth Limit as set by the Full Depth Limit Switches 48 has been reached, the electrode retracts and the machining cycle is concluded.

Figure 3:
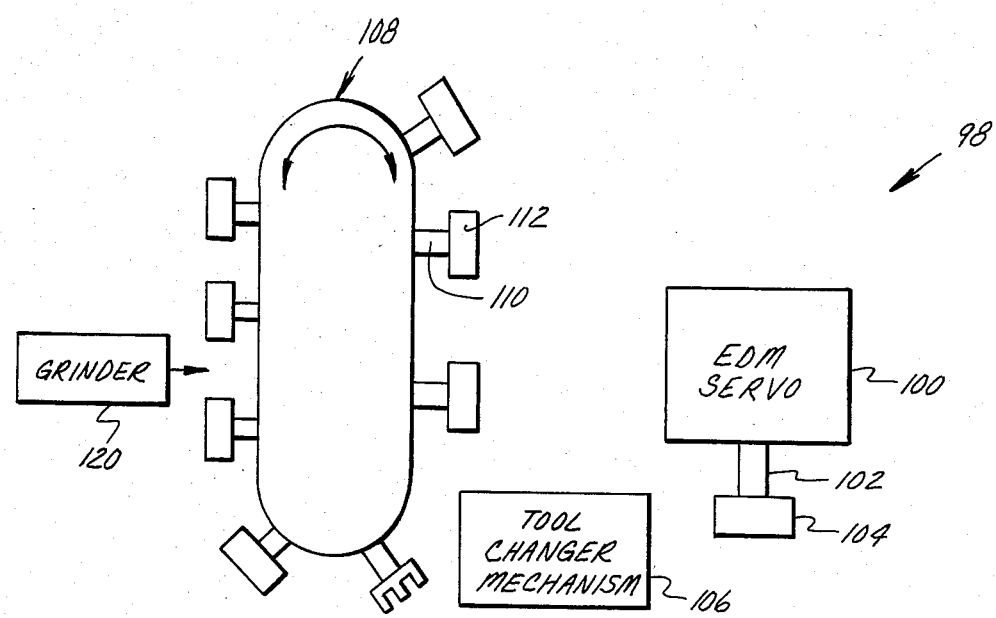
FIG. 3 is a view of a conventional EDM installation with a tool changer mechanism.

FIGS. 3 through 8 illustrate an application of the invention to an EDM installation 98. FIG. 3 shows an EDM servo 100 having a shaft 102 and an electrode 104 adjacent which are a tool changer mechanism 106 and a rotary carousel tool (electrode) holder 108. The rotary carousel 108 comprises a plurality of stations 110 each of which contains a holder for holding a particular machining electrode 112. The carousel 108 is operable to bring a particular station 110 to a point of adjacency with the tool changer mechanism 106. The tool changer mechanism 106 is operable to remove the adjacent electrode from the carousel and mount it to the servo so that it becomes the machining electrode. The tool changer mechanism operates in reverse manner to remove an electrode from the servo and deposit it in an empty station 110. In this way automated changing of the electrodes is accomplished. This application is used where complex shapes are machined in workpieces and involving successive passes by differently shaped electrodes.

Figure 4:
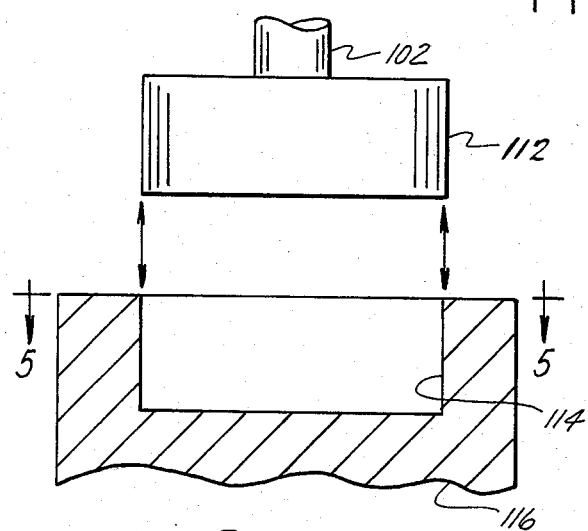
FIGS. 4 and 5 illustrate the results of machining the workpiece by a first pass with a particular electrode shown in FIG. 4.
Figure 6:
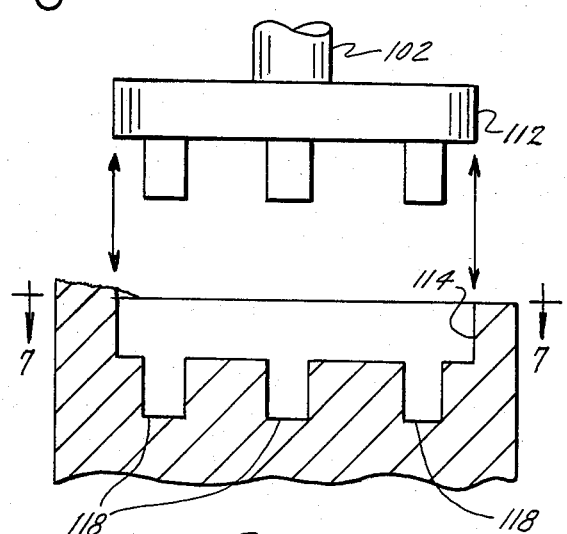
FIGS. 6 and 7 illustrate the results of machining the workpiece as shown in FIGS. 4 and 5 by a second pass with an electrode having a different configuration than that used in the first machining pass.
Figure 5:
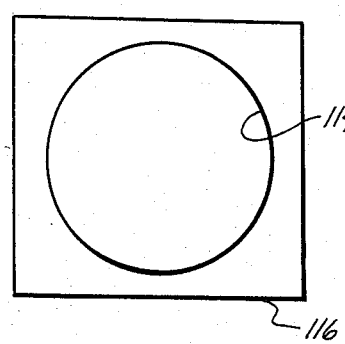
Figure 7:
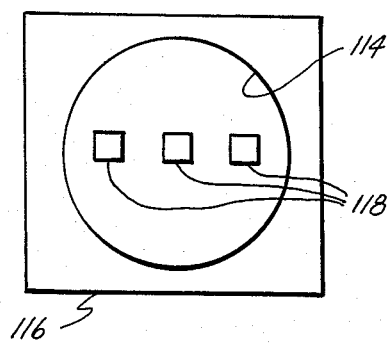

FIGS. 4 and 5 illustrate a first pass with a particular type of electrode 112 which results in a circular blind hole 114 in a workpiece 116. FIGS. 6 and 7 illustrate a second pass using a different shaped electrode 112 which results in the machining of additional square holes 118 in the bottom of hole 114. The tool changer mechanism and tool holder are operable to change from the first tool to the second tool automatically in the manner described above.

Application of the invention to this type of arrangement is advantageous in that the depth controller automatically references the starting surfaces, namely the top surface of the workpiece for the first pass and the bottom surface of hole 114 for the second pass. Thus precise depth control of the individual hole 114 on the first pass and of the holes 118 on the second occurs without the need for absolute positioning of the electrodes with respect to a fixed reference. This eliminates manual set-up and gaging procedures, and, it results in improved productivity and accuracy.

Figure 8:
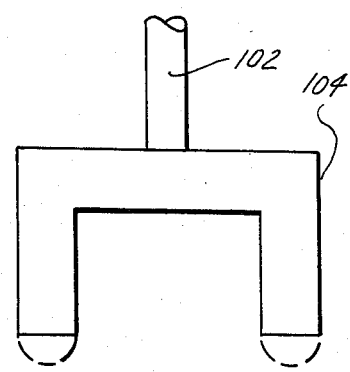
FIG. 8 illustrates in broken lines a worn condition of the tip of a particular machining electrode.

One of the reasons why the invention is particularly advantageous can be seen from consideration of FIG. 8. FIG. 8 illustrates in broken lines a worn condition of the tip of a particular machining electrode. The worn condition results in a tapered appearance of the tip which creates inaccuracy in the shape of hole being machined. The preferred practice for consistent machining accuracy is to keep the electrode tips ground flat so that electrode wear is removed and the resultant reground tip presents the true desired cross sectional area at the tip. Thus a grinder 120 may be associated with the tool holder 108 as shown in FIG. 3 for grinding the electrode tips flat. The problem with grinding the tips flat is that any fixed reference of the tip is lost in grinding. The present invention however automatically compensates for any amount of tip removal due to grinding or otherwise. Thus the EDM apparatus in use in conjunction with the depth controller of the present invention always results in the zero reference point for depth purposes being at the point at which the electrode tip arrives at the surface of the workpiece regardless of the amount of tip which has been ground off due to wear.

Furthermore, principles of the invention are applicable to other applications, and it is contemplated that not only can a reference be set as the electrode begins machining the workpiece, as has been disclosed above, but also that it may be useful in certain instances for a reference to be set upon breakthrough such as in a through hole for example. Thus the invention provides improved productivity and accuracy in EDM machining operations and versatility as well.

While a preferred embodiment has been disclosed, it will be appreciated that other embodiments are contemplated within the scope of the invention as set forth in the following claims.

What is claimed is:

1. In EDM apparatus for machining holes in conductive workpieces via electrode means mounted on a holder which is advanced toward such a workpiece by a drive means, said apparatus including a main control system comprising means for controlling the advance of said drive means including means for causing said drive means to advance said electrode means at an advance rate toward the workpiece, sensing means for sensing the initiation of machining as said electrode means approaches the workpiece, said main control system comprising means responsive to said sensing means for causing said drive means to reduce the advance rate of said electrode means to a slower one in response to initiation of machining, and an electronic depth control system operatively coupled with said main control system comprising input means for setting a desired hole depth to be machined by said electrode means in the workpiece, means for setting a reference datum from which the desired hole depth is to be measured, and position sensing means for providing a signal of the position of said holder relative to the workpiece, the improvement which comprises means for establishing said reference datum by detection of the occurence of a particular characteristic of the signal of said position sensing means caused by reduction in the advance rate of said electrode means by said main control system upon initiation of machining.

2. The improvement as set forth in claim 1 wherein said input means for setting a desired hole depth comprises means for setting a full depth limit and further including means for setting a desired machining increment and means for setting a desired number of machining increments, said main control system comprising means responsive to the setting of the desired machining increment and the setting of the desired number of such machining increments for causing the machining operation to be conducted as a series of machining increments equal to the set desired number thereof with said electrode means being retracted from the workpiece and refed on said holder at the end of certain of such machining increments.

3. In EDM apparatus for machining holes in conductive workpieces via an electrode mounted on a holder, said EDM apparatus comprising means for advancing and retracting said holder and electrode in unison toward and away from such a workpiece, means for refeeding said electrode on said holder, a main control system for controlling the advance and retraction of said holder and electrode relative to the workpiece and for controlling machining operations including reducing the velocity of advance when machining commences at a surface of the workpiece, and a depth control system operatively associated with said main control system including a sensor providing a signal indicative of advancement and retraction of said holder, said depth control system also comprising a store, the improvement which comprises utilization means operatively coupled with said sensor for sensing a characteristic of said signal caused by change in velocity of advancement of said holder which occurs upon commencement of machining at a surface of the workpiece and for causing said store to be set to a reference datum upon sensing of such characteristic, said depth control system further comprising means operatively associated with said main control system for causing the EDM apparatus to conduct subsequent machining operations on the workpiece with reference to said reference datum set in said store, said depth control system also comprising presettable input means for presetting a desired depth of hole from said reference datum in terms of a succession of preset individual machining increments, and means operatively associated with said main control system for causing said holder to advance said succession of individual machining increments to the desired depth of hole set by said presettable input means and for causing refeeding of said one electrode on said holder between certain of said individual machining increments.

4. In EDM appratus for machining holes in conductive workpieces via electrode means on a holder which is advanced toward such a workpiece by a drive means, said apparatus including a main control system comprising means for controlling the advance of said holder by said drive means in accordance with machining operations conducted by said electrode means on the workpiece and wherein said main control system is operable to cause a change in the velocity of advancement of said holder by said drive means when said electrode means arrives at a surface of the workpiece, and an electronic depth control system operatively coupled with said main control system comprising position sensing means providing a position signal representing the position of said holder, the improvement comprising means operatively coupled with said position sensing means for detecting and utilizing as a reference datum a characteristic change in said position signal which occurs when said main control system causes change in the velocity of advancement of said holder by said drive means upon the arrival of said electrode means at the surface of the workpiece.

5. In EDM apparatus for machining holes in conductive workpieces via electrode means on a holder which is advanced toward such a workpiece via a drive means, said apparatus comprising a main control system comprising means for controlling the advance of said holder by said drive means including means responsive to change in machining which occurs when said electrode means arrives at a surface of the workpiece for causing change in velocity of said holder, and position sensing means providing a position signal correlated with the position of said holder along the direction of its advancement, the improvement which comprises means operatively coupled with said position sensing means for detecting a particular characteristic change of the position signal which occurs upon arrival of said electrode means at the surface of the workpiece and causing said main control system to act upon the detected particular characteristic in subsequently controlling the position of said holder.

6. In EDM apparatus for machining holes in conductive workpieces via electrode means mounted on a holder which is positionable toward and away from such a workpiece via a drive means, said apparatus comprising a main control system comprising means for controlling the position of said holder relative to the workpiece via said drive means including means responsive to change in machining condition occurring when said electrode means arrives at a surface of the workpiece for causing change in velocity of said holder, and sensor means operatively coupled with said holder for sensing advancement thereof relative to the workpiece to provide a signal indicative of change in velocity of said holder caused by said main control means when said electrode means arrives at the surface of the workpiece, the improvement which comprises utilization means for utilizing the change-in-velocity-indicative signal provided by said sensor means for establishing a reference datum relative to which said main control system subsequently controls the positioning of said holder relative to the workpiece.

* * * * *